No. 843,720. PATENTED FEB. 12, 1907.
J. WADDELL & D. W. TOWER.
KNOB.
APPLICATION FILED JULY 3, 1906.
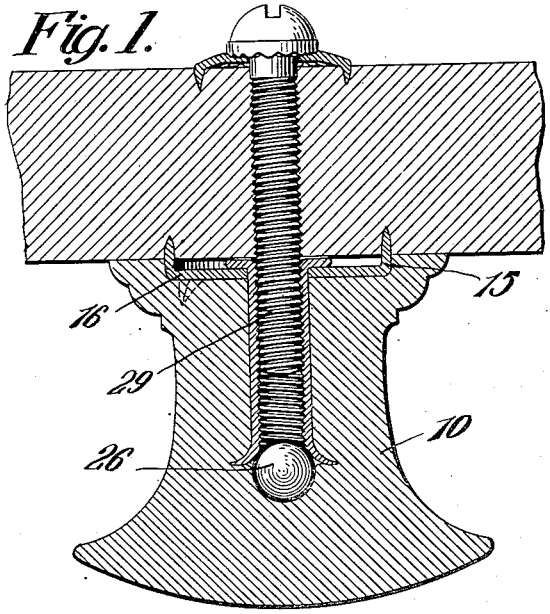
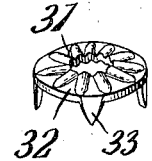
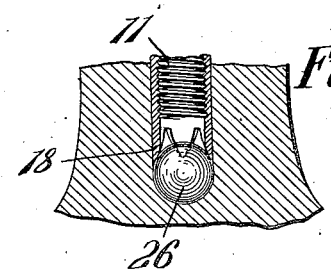
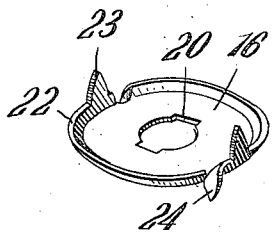
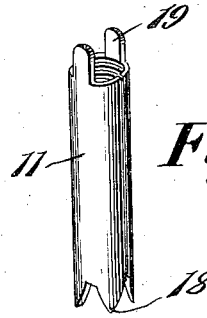
John Waddell
Daniel W. Tower
INVENTORS
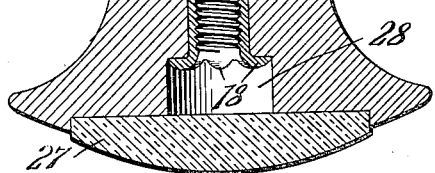
ATTORNEYS

UNITED STATES PATENT OFFICE.

JOHN WADDELL AND DANIEL W. TOWER, OF GRAND RAPIDS, MICHIGAN.

KNOB.

No. 843,720.   Specification of Letters Patent.   Patented Feb. 12, 1907.

Application filed July 3, 1906. Serial No. 324,627.

*To all whom it may concern:*

Be it known that we, JOHN WADDELL and DANIEL W. TOWER, citizens of the United States, residing at Grand Rapids, in the county of Kent and State of Michigan, have invented a new and useful Knob, of which the following is a specification.

This invention relates to devices for attaching furniture-trimmings, such as pull-knobs, handles, and like members.

The principal object of the invention is to provide a fastening by which the knob or other trimming will be securely locked in place and prevented from working loose through constant use.

A further object of the invention is to provide a trimming-attaching device which may be manufactured at very small expense and which will permit of the ready securing of the knobs in place.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional plan view through a furniture-trimming provided with attaching means constructed in accordance with the invention. Fig. 2 is a detail perspective view of the threaded sleeve to be secured within the knob or other trimming. Fig. 3 is a view illustrating the ball or similar member employed for spreading the locking-spurs of the sleeve. Fig. 4 is a detail perspective view of the knob-locking ring. Fig. 5 is a detail sectional view through a portion of the knob, showing the manner in which the sleeve is forced in position. Fig. 6 is a detail perspective view of the head of the attaching-screw. Fig. 7 is a similar view of the screw-locking washer. Fig. 8 is a view similar to Fig. 1, illustrating a slight modification of the invention.

Similar numerals of reference are employed to indicate corresponding parts throughout the several figures of the drawings.

In carrying out the invention the knob or other article to be secured in place is provided with an opening for the reception of an internally-threaded sleeve 11, and the inner face of the knob is provided with a circular recess 15 for the reception of a locking washer or ring 16.

The internally-threaded sleeve 11 is provided at its inner end with a plurality of pointed spurs 18, which are spread laterally and embedded in the material of which the knob is formed. The outer end of the sleeve is provided with a pair of small ears or teats 19, which extend through small notches 20, formed at diametrically opposite points in the ring 16, and are turned outward over the inner face of said ring, so that the ring and the sleeve may be firmly locked to each other and independent movement of the ring in any direction is prevented. The ring is provided with an outwardly-bent marginal flange 22, from which project a number of spurs 23, designed to be embedded in the article to which the knob is to be attached—as, for instance, a drawer, door, or the like—and the flange is also notched and turned back to form a number of spurs 24, which are embedded in the material of which the knob is formed.

In securing the sleeve 11 in place a spur-spreading member 26 is first dropped into the opening in the knob, and then the sleeve is forced down into the opening. This spreading member is preferably in the form of a ball or sphere, and when the points of the spurs strike the rounded surface of the ball they are deflected outward and become embedded in the material of which the knob is formed, so that the sleeve is rigidly locked in place.

In some cases, especially where the knobs are provided with separate ornamental face-pieces 27, as shown in Fig. 8, the outer portion of the knob is counterbored, forming a recess 28, so that access may be had to the spurs from the front of the knob and the spurs deflected in any suitable manner.

The internally-threaded sleeve is adapted to receive a securing-screw 29, which passes through a suitable opening formed in the drawer, door, or other article to which the knob is to be attached. The inner face of the head of the screw is provided with radial ribs or teeth 30, which are designed to engage with similar ribs 31, formed on a screw-locking washer or ring 32. This ring is formed of stamped sheet metal and is provided with a plurality of spurs 33, which embed themselves in the inner face of the drawer or other article. The washer may be slightly bowed or arched in order to permit slight yielding as the screw is turned home, and when the spurs are firmly embedded in the furniture or other article the engagement of the ribs of the washer with those of the head of the screw will positively hold said screw from turning and becoming loose.

The attaching device may be formed of any suitable metal, and the parts are preferably made of sheet metal which can be readily formed by dies.

We claim—

1. A furniture-trimming having an opening and provided with a recessed inner face, a locking-ring having spurs for engaging the trimming and spurs for engaging the article to which the trimming is attached, an internally-threaded sleeve fitted within the opening and provided with ring engaging and locking members, and locking-spurs at the inner end of said sleeve.

2. A furniture-trimming having an opening and provided with a recessed inner face, a flanged ring seated within the recess and provided with oppositely-directed spurs, an internally-threaded sleeve fitting within the opening and having lugs or teats at one end for engagement with the ring, the opposite end of said sleeve being provided with locking-spurs.

3. A furniture-trimming having an opening and provided with a recessed inner face, a flanged ring seated within the recess and provided with oppositely-directed spurs, the wall of the opening in said ring being notched, and a sleeve adapted to the opening in the trimming and having lugs at one end which interlock with said notches, the opposite end of the sleeve being provided with locking-spurs.

In testimony that we claim the foregoing as our own we have hereto affixed our signatures in the presence of two witnesses.

JOHN WADDELL.
DANIEL W. TOWER.

Witnesses:
DOUGLAS BERRY,
HAROLD M. BERTELSON.